Patented Aug. 29, 1933

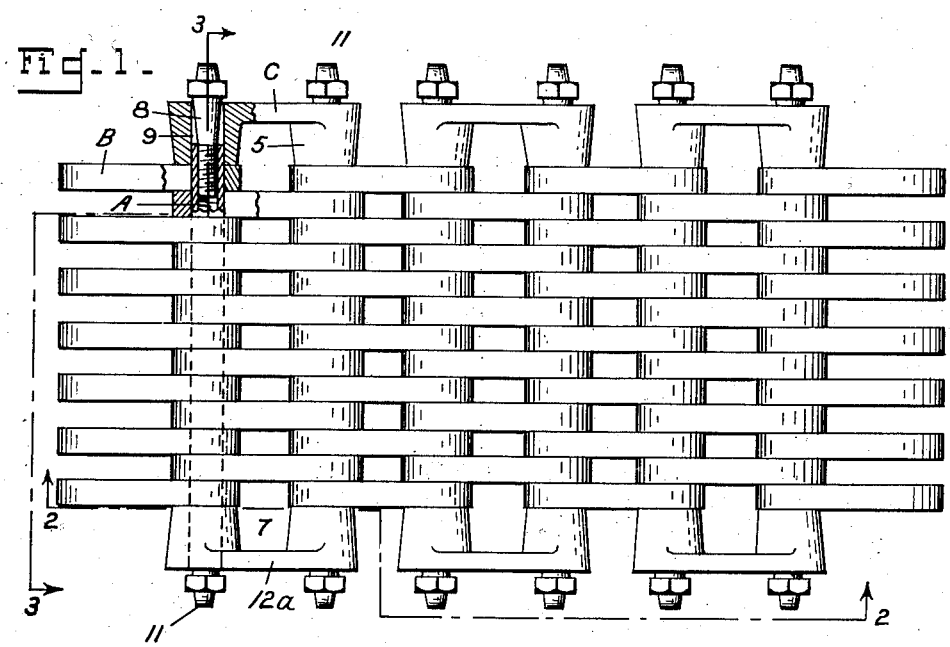
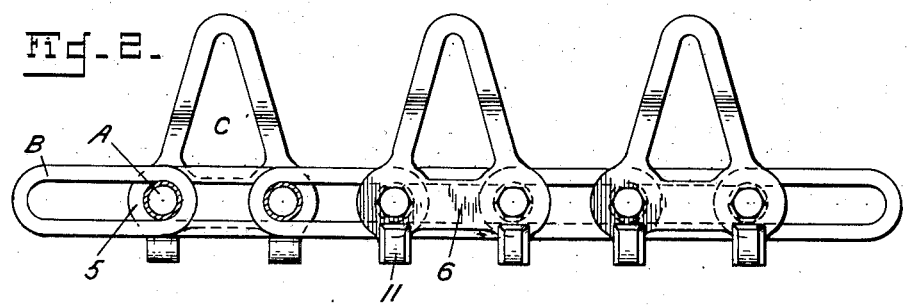
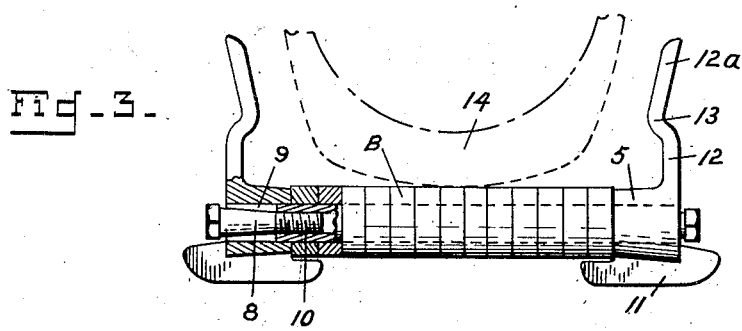

1,924,161

UNITED STATES PATENT OFFICE 1,924,161

FLEXIBLE TRACK

Harry A. Knox, Davenport, Iowa

Application August 28, 1931. Serial No. 560,022

6 Claims. (Cl. 305—10)

(Granted under the Act of March 3, 1883, as amended April 30, 1928; 370 O. G. 757)

The invention described herein may be manufactured and used by or for the Government for governmental purposes, without the payment to me of any royalty thereon.

This invention relates to a track for tracklaying vehicles.

The principal object of the present invention is to provide a light track whose component parts are constituted by small easily fabricated members that may be readily assembled. The invention is characterized by a novel side member forming a shoe, driving lug and wheel guide.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a plan view partly in section of a portion of an endless track constructed in accordance with the invention.

Fig. 2 is a view taken on the line 2—2, Fig. 1.

Fig. 3 is a view taken on the line 3—3 of Fig. 1.

Referring to the drawing by characters of reference:

The track consists of equally spaced link pins A connected by a plurality of mutually spacing links B loosely mounted thereon. On the opposite ends of each pair of pins there is placed a side member C comprising sockets or sleeves 5 fitting on the pins and connected by a web 6 whereby the link pins are rigidly held in spaced relation. The sleeves constitute driving lugs, the interspaces 7 being adapted to receive the teeth of a sprocket (not shown).

The sleeves are securely fixed to the link pins, the method shown consisting in inserting a tapered plug 8 into the slotted internally tapered end 9 of each pin. The plug is in threaded engagement 10 with the pin and as the plug is advanced it acts as a wedge to expand the pin into contact with the sleeve.

On the outer or ground side of each sleeve there is a shoe or grouser 11 designed to insure effective traction. The shoe extends beyond the ends of the sleeve to afford a relatively larger ground contact area and also for the purpose of protecting the protruding end of the plug and the portion in threaded engagement with the pin. By virtue of the protection thus afforded by the shoe, the plug will always be readily removable.

On the inner or sprocket side of the sleeves there is a guide 12 offset as at 13 intermediate its height so that the end 12a may be inclined outwardly to present a sloping surface to the side wall of the pneumatic tire 14.

The operation of removing any part for the purpose of replacement involves only the unthreading of the plugs 8.

I claim.

1. In a track, equally spaced link pins, a plurality of mutually spacing links connecting the pins, and side members on each pair of pins including spaced sleeves, a web connecting the sleeves, means for securing the sleeves in place on the pins, a shoe on the outer side of each sleeve and extending beyond the ends of the sleeve, and a wheel guide on the inner side of such sleeve.

2. In a track, equally spaced link pins, a plurality of mutually spacing links connecting the pins, and side members on each pair of pins including spaced sleeves, a web connecting the sleeves, means for securing the sleeves in place on the pins, and a shoe on the outer side of each sleeve and extending beyond the ends of the sleeve.

3. In a track, spaced link pins, side members rigidly connecting each pair of link pins and constituting driving lugs, shoes on the outer side of said members, a wheel guide on the inner side of said members, and a plurality of longitudinally slotted links embracing adjacent link pins, the link pins being loosely received in the slots of the links.

4. In a track, spaced link pins, side members rigidly connecting each pair of link pins and constituting driving lugs, shoes on the outer side of said members, and a plurality of longitudinally slotted links embracing adjacent link pins, the link pins being loosely received in the slots of the links.

5. In a track, spaced link pins, side members rigidly connecting each pair of link pins, shoes on the outer side of said members, and a plurality of longitudinally slotted links embracing adjacent link pins, the link pins being loosely received in the slots of the links.

6. In a track, spaced link pins, side members rigidly connecting each pair of link pins, and a plurality of longitudinally slotted links embracing adjacent link pins, the link pins being loosely received in the slots of the links.

HARRY A. KNOX.